US006988213B1

(12) United States Patent
Khazam

(10) Patent No.: US 6,988,213 B1
(45) Date of Patent: *Jan. 17, 2006

(54) METHOD AND SYSTEM TO SURPRESS SPECULATIVE EXECUTION OF INSTRUCTIONS IN A MICROPROCESSOR

(75) Inventor: Jonathan Khazam, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/564,041

(22) Filed: Apr. 27, 2000

Related U.S. Application Data

(63) Continuation of application No. 08/787,549, filed on Jan. 22, 1997, now Pat. No. 6,282,663.

(51) Int. Cl.
*G06F 1/32* (2006.01)
*G06F 15/00* (2006.01)

(52) U.S. Cl. ............ 713/320; 713/324; 712/233; 712/239

(58) Field of Classification Search .......... 713/320, 713/310, 300, 322, 324; 712/233, 234, 236, 712/237, 239, 238
See application file for complete search history.

(56) References Cited

U.S. PATENT DOCUMENTS

| | | | |
|---|---|---|---|
| 5,185,869 A * | 2/1993 | Suzuki ................. 712/234 |
| 5,228,131 A | 7/1993 | Ueda et al. |
| 5,327,536 A * | 7/1994 | Suzuki ................. 712/238 |
| 5,452,401 A * | 9/1995 | Lin ..................... 713/322 |
| 5,454,117 A | 9/1995 | Puziol et al. |
| 5,511,198 A | 4/1996 | Hotta |
| 5,522,053 A * | 5/1996 | Yoshida et al. .......... 711/213 |
| 5,590,061 A | 12/1996 | Hollowell, II et al. |
| 5,701,448 A | 12/1997 | White |
| 5,724,565 A * | 3/1998 | Dubey et al. ........... 712/245 |
| 5,740,417 A | 4/1998 | Kennedy et al. |
| 5,787,297 A | 7/1998 | Lin |
| 5,790,845 A * | 8/1998 | Shimada et al. ......... 712/238 |
| 5,799,180 A | 8/1998 | Shiell et al. |
| 5,848,269 A * | 12/1998 | Hara ................... 712/239 |
| 5,872,965 A | 2/1999 | Petrick |
| 5,878,254 A * | 3/1999 | Shimada et al. ......... 712/238 |
| 5,880,979 A | 3/1999 | Mennemeier et al. |
| 5,996,083 A | 11/1999 | Gupta et al. |
| 6,282,663 B1 * | 8/2001 | Khazam ................ 713/320 |

FOREIGN PATENT DOCUMENTS

JP  403017717 A  *  1/1991

\* cited by examiner

*Primary Examiner*—Chun Cao
(74) *Attorney, Agent, or Firm*—Blakely, Sokoloff, Taylor & Zafman LLP

(57) ABSTRACT

During compilation of a computer program, a branch instruction within the computer program is identified as having a characteristic (e.g., as being dependent upon unpredictable data) that influences the accuracy of a branch prediction for the branch instruction. Responsive to this identification, a compiler, again during compilation of the computer program, flags the branch instruction. During execution of the computer program, speculative execution of instructions is suppressed responsive to detection of the flagged branch instruction.

10 Claims, 15 Drawing Sheets

METHOD AND SYSTEM TO SURPRESS SPECULATIVE EXECUTION OF INSTRUCTIONS IN A MICROPROCESSOR

This application is a continuation of application Ser. No. 08/787,549, filed Jan. 22, 1997, now issued as U.S. Pat. No. 6,282,663.

FIELD OF THE INVENTION

The present invention pertains to the field of power management within integrated circuits. More particularly, the present invention relates to a method and apparatus for performing power management by selectively suppressing the speculative execution of instructions to regulate power consumption within a microprocessor.

BACKGROUND OF THE INVENTION

The management of power consumption within microprocessors is becoming increasingly crucial for a number of reasons. As operating frequencies and circuit densities have increased, heat generation within microprocessors has also increased to the extent that thermal considerations are a limiting factor in integrated circuit (IC) design and manufacture. Specifically, the dissipation of heat generated by a microprocessor is a design constraint in both portable and desktop computers. In desktop computers, the dissipation of heat has serious cost implications since a cooling apparatus is typically required to support the microprocessor. In portable computers, in addition to increased costs due to cooling apparatus, the problem of cooling a microprocessor is exacerbated by the space limitations within which such cooling apparatus can be installed. Indeed, the operating frequency of a microprocessor that can be installed within a portable computer may be determined, and limited, by the ability of associated cooling apparatus adequately to cool the microprocessor. Accordingly, the reduction of heat generated by a microprocessor is highly desirable.

Further, the proliferation of portable computers, which must often rely on self-contained batteries for power, has also led to increasing attention being given to reducing power consumption within such portable computers. Power management efforts in the field of portable computing have focused on extending the time a portable computer can operate while drawing power from a charged battery. The minimization of power consumption and heat generation within a microprocessor of a portable computer is also particularly desirable for a number of reasons. Increased battery life results from less power being consumed by both the microprocessor and cooling devices employed in computers to cool the microprocessor, such as fans. Decreased heat generation within the microprocessor also allows processors having higher operating frequencies to be installed in portable computers. Decreased heat generation also allows for a reduction in the size, or even the elimination, of cooling apparatus associated with a microprocessor, thus facilitating more compact portable computers.

Accordingly, there is a need to reduce both the power consumption, and specially the accompanying heat generation, within integrated circuits in general, and within microprocessors in specific.

SUMMARY OF THE INVENTION

According to a first aspect of the invention there is provided a method of reducing power consumption within a processor having branch prediction circuitry. The method requires detecting the occurrence of a trigger event and then suppressing speculative execution of instructions within the processor in response to the detection of the trigger event.

In one embodiment, the operating temperature of the processor is monitored, and the occurrence of the trigger event is detected upon the transcendence of a predetermined thermal threshold by the operating temperature of the processor. In other embodiments, the step of detecting the occurrence of the trigger event may comprise detecting user activation of a suppression signal or detecting the retrieval of a branch instruction, from a memory resource and for processing by the processor, for which a probability of being correctly predicted is less than a predetermined threshold. The probability of the branch instruction being correctly predicted may be determined by a compiler at the time of compilation of the branch instruction, or may require determining whether the branch instruction includes a "data dependent" condition. Alternatively, the probability of the branch instruction being correctly predicted may be determined by examining a branch prediction history for the branch instruction. Suppressing speculative execution of instructions by the processor may entail disabling the branch prediction circuitry.

According to a second aspect of the invention there is provided power management circuitry for reducing power consumption within a processor having a branch prediction capability. The power management circuitry includes a detection circuit configured to detect the occurrence of a trigger event, and a suppression circuit, coupled to the detection circuit, which suppresses speculative execution of an instruction within the processor in response to the detection of a trigger event by the detection circuit.

In one embodiment, the detection circuit detects the transcendence of a predetermined threshold temperature by an operating temperature of the processor, and in another embodiment detects user activation of a suppression signal.

In a further embodiment, the detection circuit may detect the retrieval of a branch instruction, from a memory resource and for processing by the processor, for which a probability of being correctly predicted is less than a predetermined threshold. The suppression circuit operatively disables the branch prediction circuitry.

The invention also provides a microprocessor including power management circuitry as described above.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for selectively suppressing the speculative execution of instructions within a pipelined microprocessor are described. In the following description, for purposes of explanation, numerous specific details are set forth in order to provide a thorough understanding of the present invention. It will be evident, however, to one skilled in the art that the present invention may be practiced without these specific details.

Computer System and Microprocessor Overview

Figure 1:
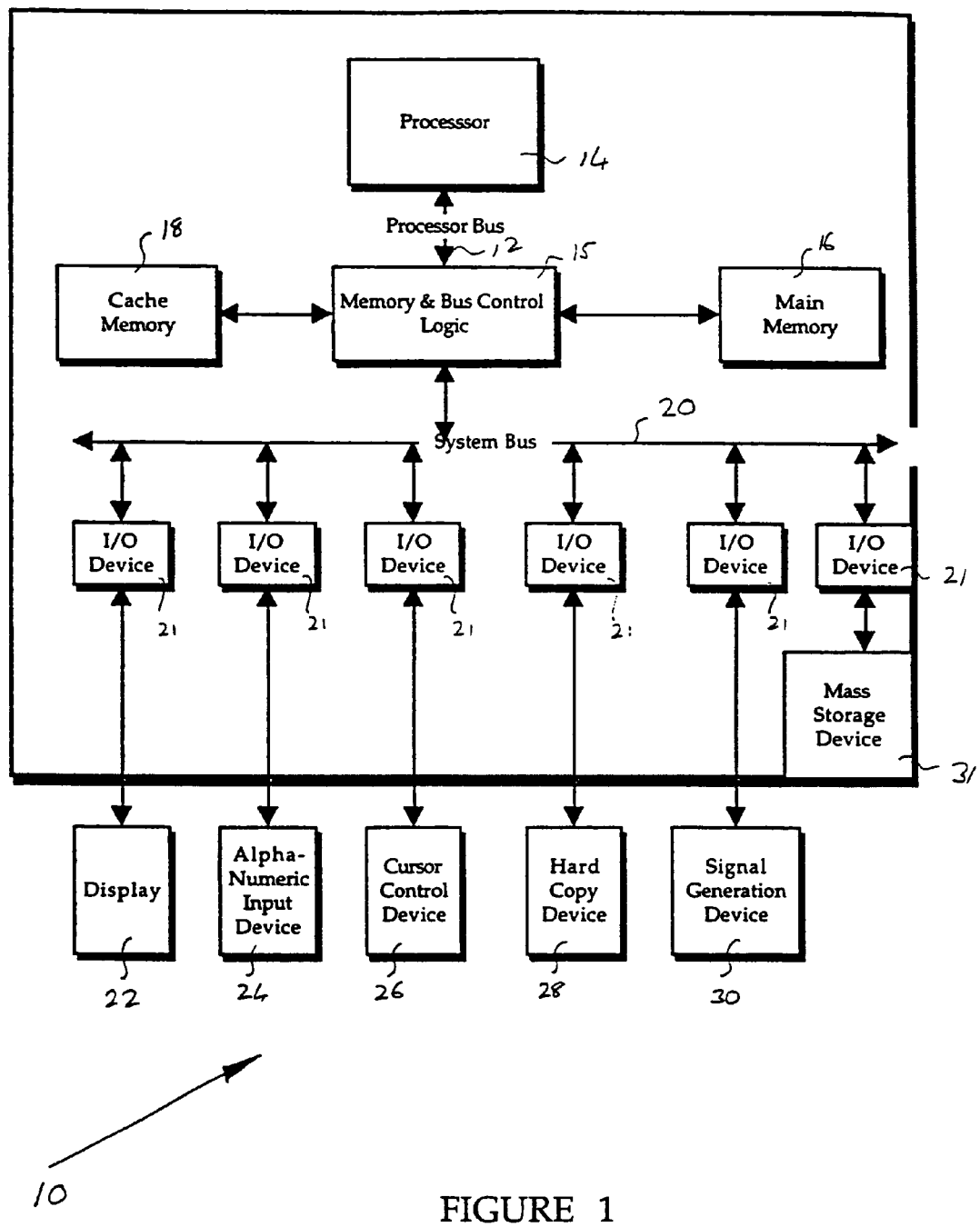
FIG. 1 is a diagrammatic representation of a computer system within which the present invention may be employed.

Referring to FIG. 1, an overview of a computer system 10, which may be utilized in conjunction with any one of the described embodiments of the present invention, is shown in block diagram form. It will be understood that, while FIG. 1 is useful for providing an overall description of a computer system, a number of details of the system are not shown. As necessary for disclosure of the present invention, further detail is set forth with reference to other figures provided with the specification. Further, the present invention is described with reference to exemplary embodiments. Alternative embodiments which may be conceived by one of ordinary skill in the art are considered within the scope of the invention. As illustrated in FIG. 1, the computer system 10 comprises a processor bus 12 for communicating information, and a microprocessor 14, coupled to the bus 12, for processing information. The processor bus 12 couples the microprocessor 14 to memory and bus control logic 15 (also termed a bus bridge), through which the processor has access to a main memory 16, which is typically a random access memory (RAM), for storing information and instructions for the microprocessor, and to a cache memory 18. The memory and bus control logic 15 is also coupled to system bus 20 over which a number of peripheral devices, coupled to the system bus 20 via dedicated input/output (I/O) devices 21, communicate with each other, the memories 16 and 18, and the microprocessor 14. The peripheral devices include a display unit 22 (such as a cathode ray tube (CRT) or liquid crystal display (LCD)), an alpha-numeric input device 24 (such as a keyboard), a cursor control device 26 (such as a mouse or other pointing device), a hard copy device 28 (such as a printer or plotter for providing visual representations of computer images), and a signal generation device 30 (such as a microphone or loudspeaker). The computer system 10 also includes a mass storage device, such as a magentic disk and associated drive unit, which is also coupled to the systems bus 20 via an I/O device 21.

Figure 2:
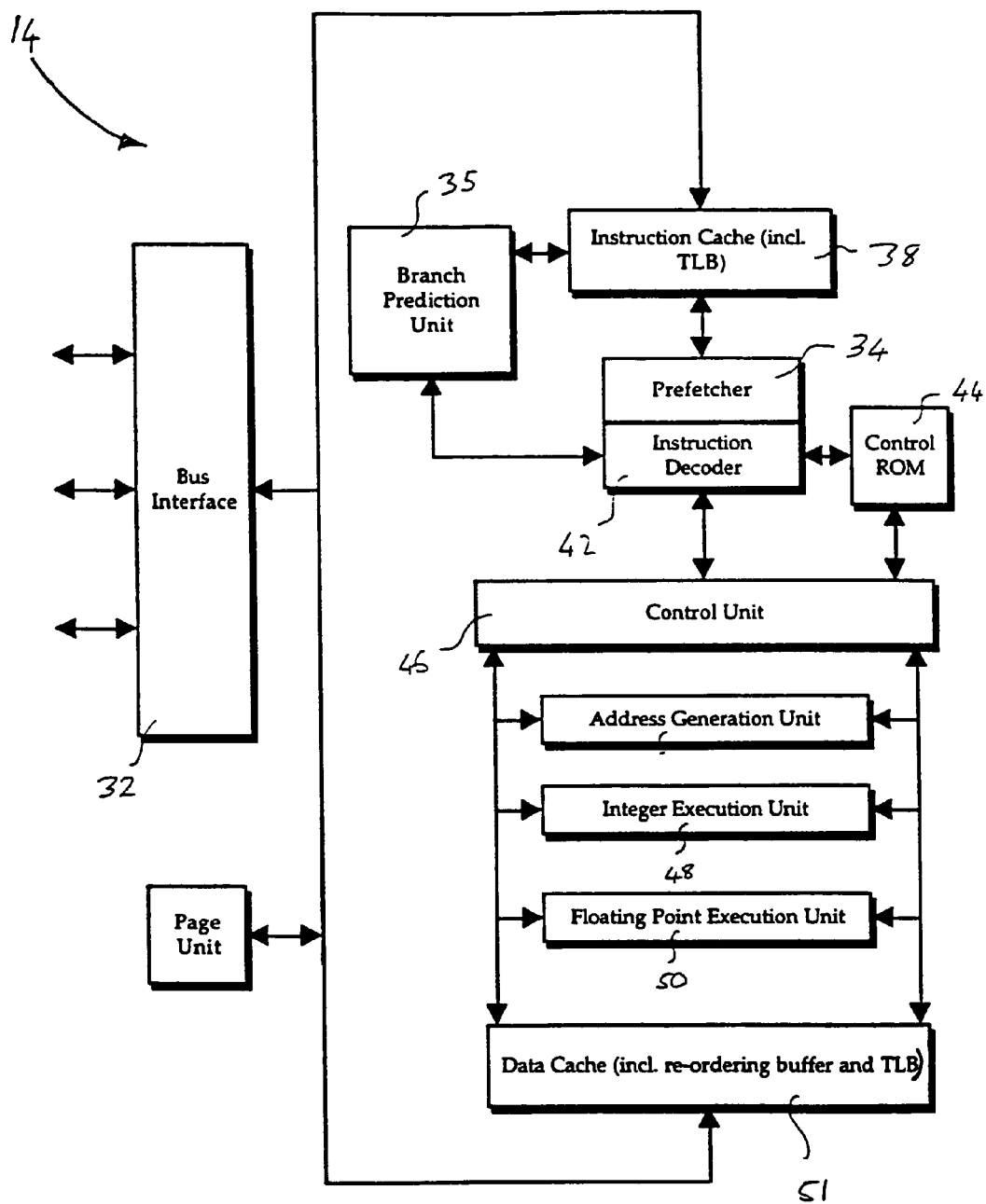
FIG. 2 is a diagrammatic representation of a microprocessor within which the present invention may be employed.

Referring now to FIG. 2, a more detailed overview of the microprocessor 14 of FIG. 1 is shown in block diagram form. The microprocessor 14 comprises a bus interface unit 32, which provides the interface between the microprocessor 14 and the system bus 12 of the computer system 10. The bus interface unit 32 is coupled to allow a prefetcher 34 to access the main memory 16 of the computer system 10, via an instruction cache 38. The prefetcher 34 retrieves instructions, indexed by an instruction pointer, from the instruction cache 38 or from main memory 16 via the bus interface unit 32. A branch prediction unit 35 provides speculative predictions for branch instructions retrieved by the prefetcher 34, and then also outputs an instruction pointer, indexing either a sequential memory address or a target memory address, depending on whether a branch is predicted as being taken or not taken. The prefetcher 34 propagates instructions retrieved from either the instruction cache 38, or the main memory 16, to a decoder 42 for decoding into a set of micro-operations ($\mu$ops) for downstream processing. A control read only memory (ROM) 44 is coupled to the decoder 42 and receives entry-points from the decoder 42. The decoder 42 and the control ROM 44 supply micro-operations to a control unit 46. The control unit 46 supplies an integer pipeline execution unit 48, and a floating-point pipeline execution unit 50, with integer and floating-point instructions, respectively, for execution. The integer pipeline execution unit 48 and the floating-point pipeline execution unit 50 have access to a data cache 51 when executing the instructions. Micro-operations are also supplied from the control unit 46 to an address generation unit 52, which generates and translates address information.

Branch Prediction Overview

It is well known for microprocessors to employ pipelining to enhance performance. In a pipelined microprocessor, various functional units, for performing different functions on an instruction, operate simultaneously on multiple instructions, thus allowing the microprocessor to achieve increased levels of performance. For example, an instruction prefetcher, an instruction decoder and instruction execution units may all perform their designated functions on multiple instructions in a simultaneous manner. During any clock cycle, the instruction execution units may be executing a first instruction, while the instruction decoder decodes a second instruction and the prefetcher fetches a third instruction. In a subsequent clock cycle, the execution unit will receive the decoded second instruction from the instruction decoder, and proceed to execute the second instruction, while the decoder receives the third instruction from the prefetcher and the prefetcher retrieves yet a further instruction. In this manner, the various functional units of the microprocessor are prevented from stalling as a result of the lack of availability of instructions on which to perform their designated functions. A deeper degree of pipelining can be achieved by subdividing the broad functions performed by each of the functional units into higher resolution pipeline stages.

A pipelined microprocessor operates most efficiently when instructions are executed in the order in which they appear in memory as a program. However, computer programs typically include a large number of branch instructions which, upon execution, may cause instructions to be executed in a sequence other than the order in which they appear in memory. Specifically, when a branch instruction is executed, execution continues either with the next sequential instruction from memory or execution jumps to an instruction located at a "branch target" address.

A branch instruction is classified as being "taken" if qualifying conditions set by the branch instruction are met and the branch instruction causes the execution sequence to jump to a branch target instruction address. On the other hand, a branch instruction is said to be "not taken" if execution continues with the next sequential instruction in memory.

A branch instruction may furthermore be classified as being either conditional or unconditional. An unconditional branch is taken every time the instruction is executed, while a conditional branch is either "taken" or "not taken" depending on the resolution of a qualifying condition presented by the branch instruction. Which instructions to execute subsequent to the execution of a branch instruction cannot be determined with absolute certainty until a condition presented by the branch instruction is resolved. However, rather than wait for the relevant condition to be resolved, microprocessors may attempt to perform a branch prediction. Specifically, the microprocessor may attempt to predict, or "guess", whether a branch instruction will be "taken" or "not taken" and, if taken, to predict a target address for the branch instruction. If the branch instruction is predicted to be "not taken", the microprocessor retrieves and speculatively executes the next, sequential instructions in memory. If the branch instruction is predicted to be "taken", the microprocessor fetches and speculatively executes instructions located at and beyond a predicted branch target address. The instructions processed through the pipeline stages of a microprocessor following a predicted branch prediction are termed "speculative instructions", as at the time of processing of these instructions, it is unknown whether the results generated thereby will in fact be required. Accordingly, operations performed by the speculative instructions can often not be completed for a number reasons. For example, if a memory write operation is executed speculatively, the results of the write operation cannot be written to external memory until all branch instructions, upon which the execution of the memory write instruction is dependent, are resolved. This is because the write instruction may improperly alter the contents of memory based on a mispredicted branch. If the branch prediction is ultimately determined to be correct, the speculative instructions can be validated, or "retired". For the memory write example given above, the results of the write operation can then be written to external memory. On the other hand, if the branch prediction is eventually found to be incorrect, then speculative instructions processed as a result of the mispredicted branch are discarded, or "flushed" from the microprocessor. As will readily be appreciated, when a branch prediction is correct, a considerable windfall in microprocessor performance is gained, as the microprocessor was not stalled pending the resolution of a branch condition. If the branch prediction is incorrect, then the performance of the microprocessor is not significantly worse than had the microprocessor simply stalled pending resolution of the relevant branch condition.

A number of methods of performing branch predictions currently exist. One such method requires the maintenance of tables which have entries providing an indication of the history of branch instructions executed within the microprocessor. For example, a table may include an entry for all branch instructions encountered within the microprocessor, and a record of whether a qualifying branch condition presented by each branch instruction resulted in the branch being taken or not taken. Such tables may also contain entries storing a history of earlier branch predictions for each branch instruction, and whether or not these earlier predictions were correct or incorrect. The maintenance of such tables allows the microprocessor to generate predictions for branch instructions by evaluating whether the relevant branch condition was previously resolved to be "taken" or "not taken", and/or whether an earlier prediction proved to be correct or incorrect.

Figure 3:
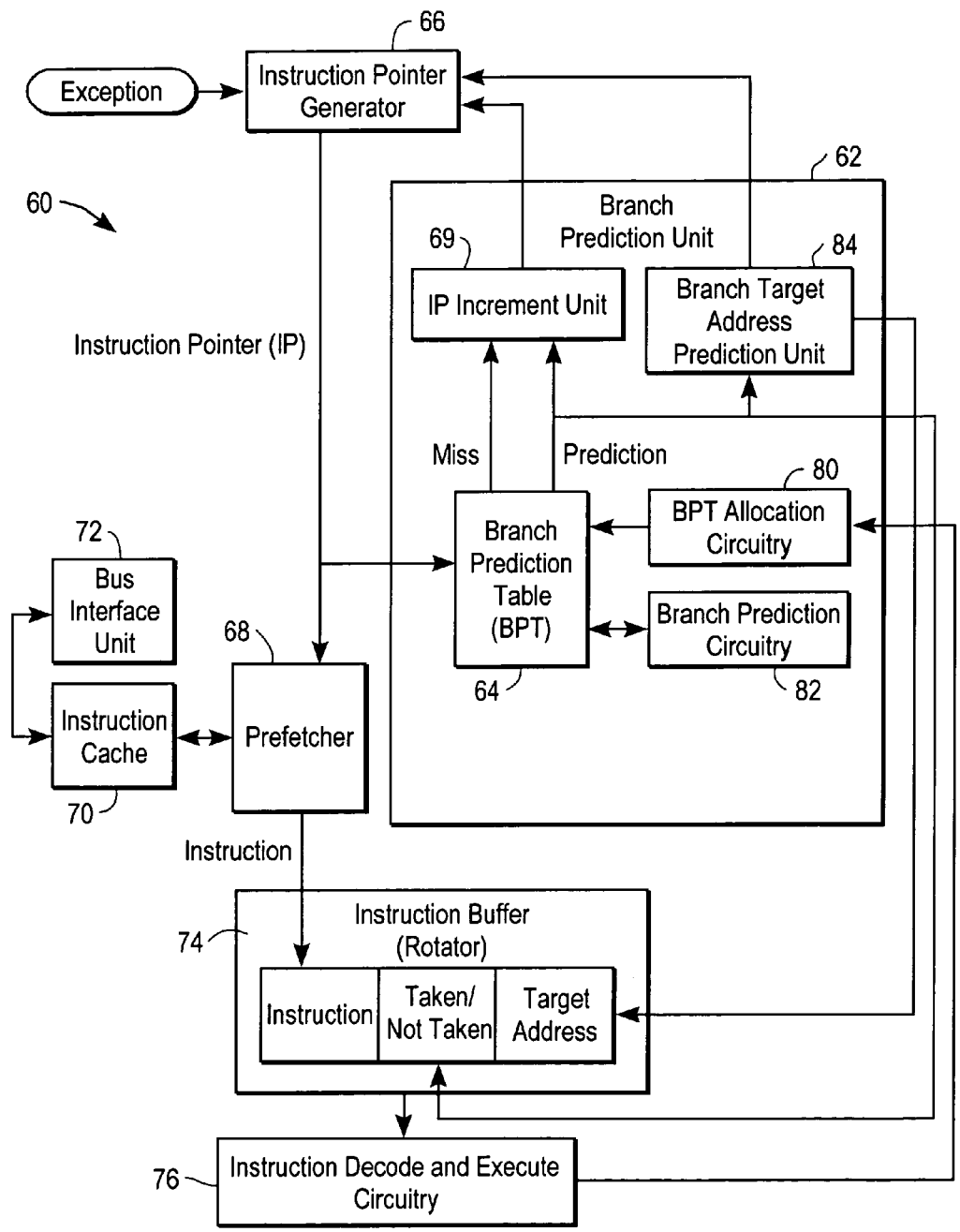
FIG. 3 is a diagrammatic representation of the microprocessor of FIG. 2, and shows further details regarding a branch prediction unit (BPU) within the microprocessor.

An example of such a table is a branch prediction table (BPT) which may be maintained within the branch prediction unit, and which provides a cache for recent branch predictions and associated information. Referring now to FIG. 3, there is illustrated a portion of a microprocessor 60 incorporating a branch prediction unit 62. The branch prediction unit 62 includes a branch prediction table (BPT) 64, which may be implemented within a N-way, set-associative or a direct-mapped memory. The microprocessor 60 further includes an instruction pointer (IP) generator 66 and a prefetcher 68. The prefetcher 68 retrieves instructions, indexed by an instruction pointer (IP) generated by the IP generator 66, from an instruction cache 70 or from main memory via the instruction cache 70. The prefetcher 68 then propagates retrieved instructions to an instruction buffer (IB) 74, where the instructions are buffered prior to being forwarded to the instruction decode and execute circuitry 76.

As illustrated in FIG. 3, an instruction pointer, identifying a new instruction to be retrieved, is presented simultaneously to the prefetcher 68 and to the BPT 64. While the prefetcher 68 retrieves the instruction indexed by the instruction pointer, a determination is made as to whether an entry for the instruction referenced by the instruction pointer is present in the BPT 64 (i.e., whether there is a "hit" in the BPT 64). This determination may be made using a tag value, which comprises part of the instruction pointer and which corresponds to a tag value employed by the instruction cache 70 to identify a cache line for the indexed instruction. Initially, the BPT 64 is empty, and a MISS signal is generated within the BPT 64. An instruction pointer (IP) increment unit 68 receives the MISS signal, and increments the instruction pointer by one to identify the next sequential instruction of the program in memory. The incremented instruction pointer is then propagated to the instruction pointer generator 66, which in turn outputs the incremented instruction pointer. In other words, when the BPT 64 generates a MISS signal, the microprocessor 60 assumes that either the instruction indexed by the instruction pointer is not a branch instruction or, if it is a branch instruction, that the branch instruction will not be taken. The incremented instruction pointer is then propagated from the instruction pointer generator 66 back to the prefetcher 68 and the BPT 64, and the process described above is repeated.

Instructions retrieved by the prefetcher 68 are forwarded to the instruction buffer 74 (also termed a "rotator"), and then propagated to the instruction decode and execute circuitry 76. The instruction decode and execute circuitry 76 will encounter and process a number of branch instructions in the course of executing a program. For each branch instruction encountered, the instruction decode and execute circuitry 76 activates BPT allocation circuitry 80, which in turns allocates an entry within the BPT 64 for the relevant branch instruction. The BPT allocation circuitry 80 furthermore writes branch prediction information (e.g., whether the relevant branch instruction was "taken" or "not taken") into each entry in the BPT 64. This branch prediction information may then be utilized by branch prediction circuitry 82 to predict whether the relevant branch instruction will be "taken" or "not taken" when next encountered in the instruction stream. The branch prediction circuitry 82 may indicate a prediction within an entry in the BPT 64, for example, by setting a prediction bit to one or zero.

Figure 4:
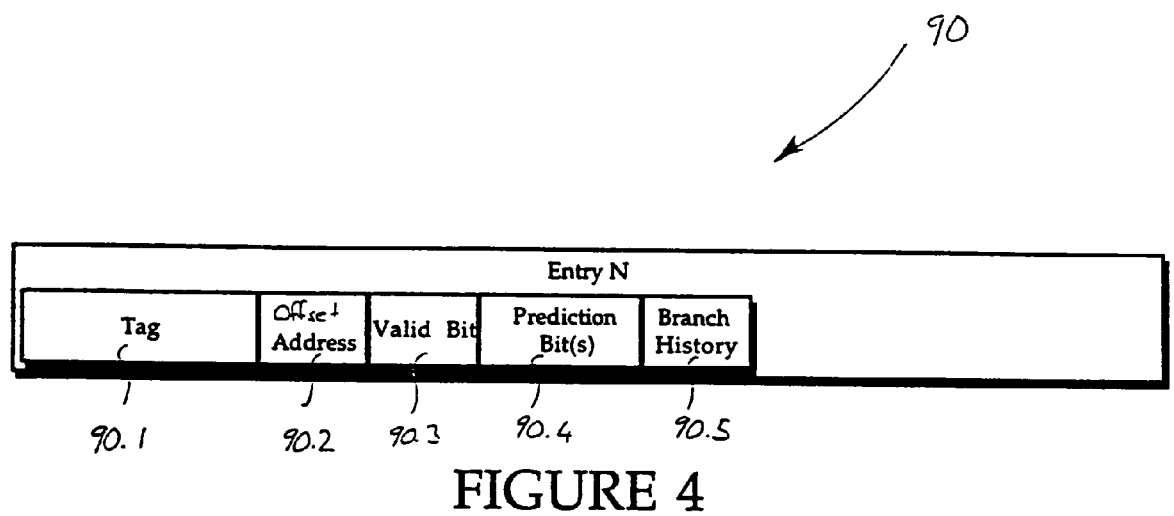
FIG. 4 is a diagrammatic representation of an entry within a branch prediction table (BPT) within the BPU illustrated in FIG. 3.

Referring to FIG. 4, there is shown an example of an entry 90 within the BPT 64. The entry 90 includes a tag field 90.1, an offset address field 90.2, a valid bit field 90.3, a prediction bit field 90.4 and a branch history field 90.5. The tag field 90.1 is used to identify a "hit" within the BPT 64 when the contents of this field correspond to a tag portion of an instruction pointer. The offset address field 90.2 is used to identify an instruction (or set of instructions) that may be stored in a common instruction cache line within the instruction cache 70. The valid bit field 90.3 indicates whether the entry 90 is valid, and this bit is set to 0 when the entry 90 is deallocated. The prediction bit field 90.4 indicates whether the branch instruction associated with the entry 90 will be predicted to be "taken" or "not taken". The state of the field 90.4 is set by the branch prediction circuitry 82, which employs a prediction algorithm and branch resolution information, such as that stored in the branch history field 90.5, to determine the state of the field 90.4. The branch history field 90.5 maintains a record of the branch history for the branch instruction associated with the BPT entry 90.

As execution of a computer program continues, it will be appreciated that more and more entries are allocated within the BPT 64. Eventually, an instruction pointer (or at least a tag portion thereof) from the IP generator 66 will correspond to an entry within the BPT 64, and a "hit" will have occurred. The BPT 64 then outputs a prediction of either "taken" or "not taken" based, for example, on the state of the prediction bit discussed above. If the prediction is "not taken", then the IP increment unit 69 is activated to increment the instruction pointer by one, and to propagate this incremented instruction pointer to the IP generator 66. If the prediction is "taken", then a branch target address prediction unit 84 is activated to provide a speculative branch target address. The speculative branch target address may be specified within the branch instruction itself. Alternatively, the branch target address prediction unit 84 may output an address written to the BPT 64 by the BPT allocation circuitry 80. The branch target address generated by the prediction unit circuitry 82 is propagated to the IP generator 66, from which it is recirculated to the prefetcher 68 and the BPT 64.

Instructions fetched by prefetcher 68 are forwarded to the instruction decode and execute circuitry 76 for decoding and execution. Instructions fetched after a predicted branch instruction are regarded as being "speculative" and are speculatively processed through the various pipeline stages within the decode and execute circuitry 76, until the qualifying condition set by the relevant branch instruction is resolved. Specifically, a qualifying condition set by branch instructions is resolved and evaluated within the instruction decode and execute circuitry 76. Should it transpire that the branch prediction was correct, then the speculatively processed instructions are retired or otherwise committed. Alternatively, should it transpire that a relevant branch prediction was incorrect, then all instructions speculatively processed by functional units of the microprocessor are discarded or flushed from the microprocessor pipeline. When branches are mispredicted, it will be appreciated that power expended by the microprocessor to process the speculative instructions is wasted. In either case, an entry within the BPT 64 corresponding to the relevant branch instruction is updated to reflect the accuracy or inaccuracy of the prediction. Depending on the implementation, each entry within BPT 64 may reflect a history of branch predictions and the accuracy thereof. Additional tables accessed by the branch prediction unit 62, but not specifically discussed herein, may also be updated. In order to allow the downstream instruction decode and execute circuitry 76 to evaluate whether a branch instruction was correctly predicted, it is necessary to associate an indication of the prediction with each speculatively predicted branch instruction. Accordingly, a prediction provided from the BPT 64 is also provided to the instruction buffer 74, and associated with each speculatively executed branch instruction therein.

The BPT 64 provides a cache for prediction information for branch instructions of an executing computer program. It will be appreciated that the BPT 64 is of limited size, and that entries may accordingly need to be deallocated in order to make room for new entries corresponding to newly encountered branch instructions. It may thus occur that the BPT 64 receives an instruction pointer corresponding to a previously predicted branch instruction for which there is no entry in the BPT 44, as a result of the appropriate entry having been deallocated. In this case, the branch prediction unit 62 may nonetheless generate a prediction by accessing other tables (not shown) associated with the branch prediction unit 62. In other words, the branch prediction process is not limited to branch instructions having entries allocated within the BPT 64.

Overview of the Invention

The present invention aims to reduce power consumption within a microprocessor by selectively suppressing the processing of instructions, for which the need is not certain beyond a predetermined certainty level. In one embodiment of the invention, the speculative processing of instructions, in an instruction stream, after a branch prediction for a branch instruction but prior to the resolution of the branch instruction, is suppressed under certain conditions. While this has the effect of introducing a potential reduction in performance, a substantial power savings can be achieved.

Figure 5:
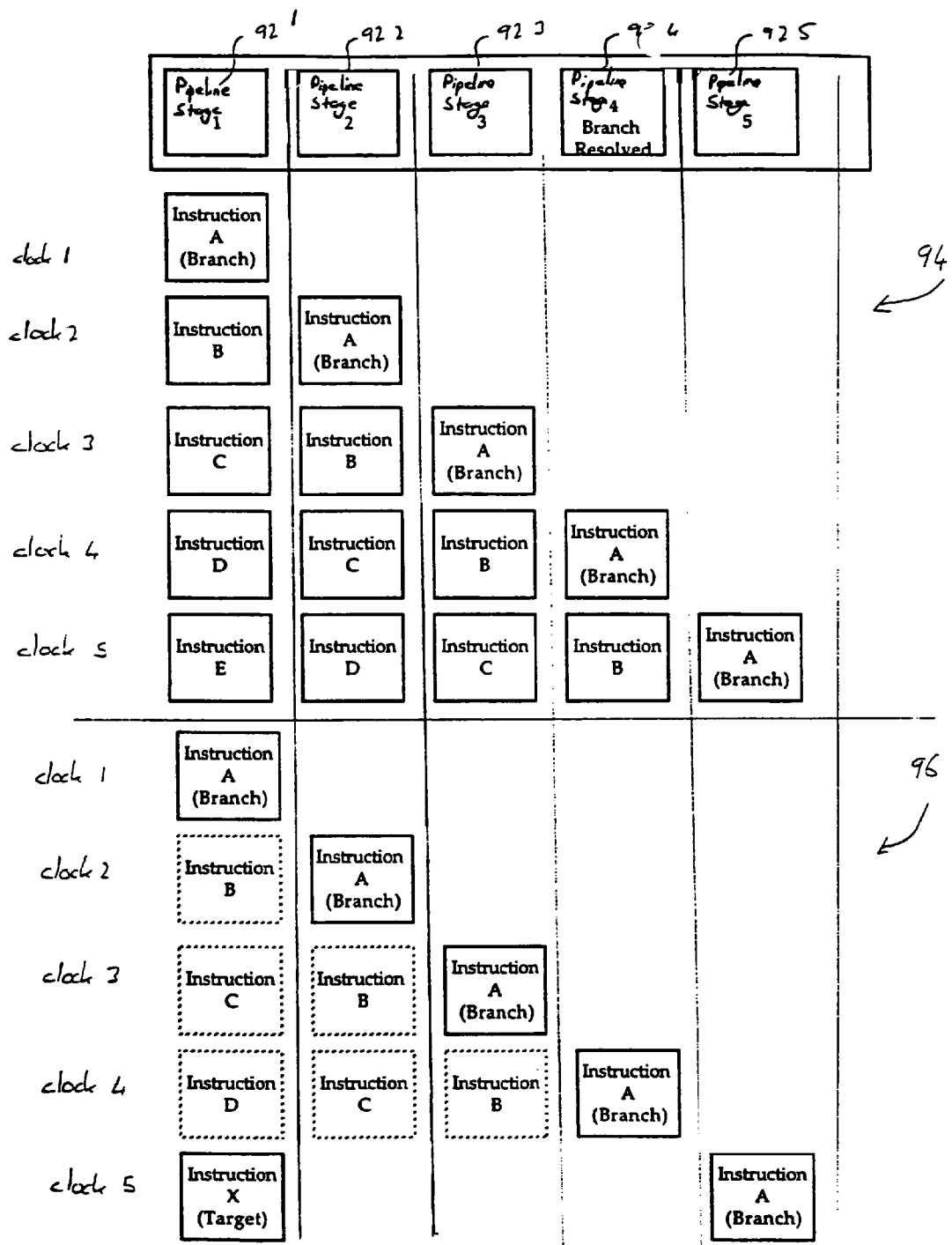
FIG. 5 is a schematic representation of the progress of an instruction stream, through a number of pipeline stages within a microprocessor, in two different scenarios.

FIG. 5 is a schematic illustration showing the processing of an instruction stream through a pipelined microprocessor employing branch prediction and speculative instruction execution. Only five exemplary pipeline stages 92.1–92.5 are shown for illustrative purposes, and are intended to be representative of any pipeline stages within the microprocessor. For example, the pipeline stages 92.1–92.5 may include instruction fetch, decode, execute or write back pipeline stages. The deeper the pipeline, the greater the amount of work (and power) wasted after a mispredicted branch. The progress of the instruction stream over five click cycles, and in two scenarios 94 and 96, is shown. In both scenarios 94 and 96, an INSTRUCTION A, which is a branch instruction, is received at pipeline stage 92.1 in click cycle 1. In the first scenario, the branch option presented by INSTRUCTION A is predicted by a branch prediction unit to be "not taken". As a result, the next sequential instruction from memory, namely INSTRUCTION B, is received at pipeline stage 92.1 in clock cycle 2, and INSTRUCTION A proceeds to pipeline stage 2. Sequential instructions continue to feed into the pipeline until INSTRUCTION A has been processed at pipeline stage 92.4, where the branch option presented by INSTRUCTION A is finally resolved. In scenario 94, the prediction was correct, and a performance advantage is obtained in that INSTRUCTIONS B, C and D have been at least partially processed through the pipeline. In the scenario 96, the same sequence of events as described above occurs, but INSTRUCTION A is resolved at pipeline stage 92.4 to be "taken", and this branch instruction was accordingly mispredicted in pipeline stage 92.1. Consequently, INSTRUCTIONS B, C and D are flushed from the pipeline during clock cycle 5, and the instruction stream is resteered to target INSTRUCTION X. It will be appreciated that the processing of INSTRUCTIONS B, C, and D (as shown in broken line) through pipeline stages 92.1–92.4 was, in this scenario, unnecessary and a waste of microprocessor power.

The present invention proposes, under certain predetermined conditions, suppressing the speculative processing of instructions through pipeline stages to reduce the power consumed by the microprocessor. For example, in the scenarios 94 and 96 and in accordance with the instruction, only INSTRUCTION A would proceed through the pipeline stages 92.1–92.4 during clock cycles 1–4, and other instructions would only enter the pipeline once INSTRUCTION A had been resolved in clock cycle 4 (i.e., the pipeline is stalled pending resolution of a branch condition), assuming the predetermined conditions are met. This suppression of speculative processing may be achieved by disabling the branch prediction unit within the microprocessor. This results in a power reduction as a result of the non-activity of the branch prediction unit itself, and as well as the lessened activity in pipeline stages downstream of the branch prediction unit. For example, the function units for performing the processing required in downstream pipeline stages may be disabled by power management circuitry that simply disables clock signals to these functional units.

Figure 6:
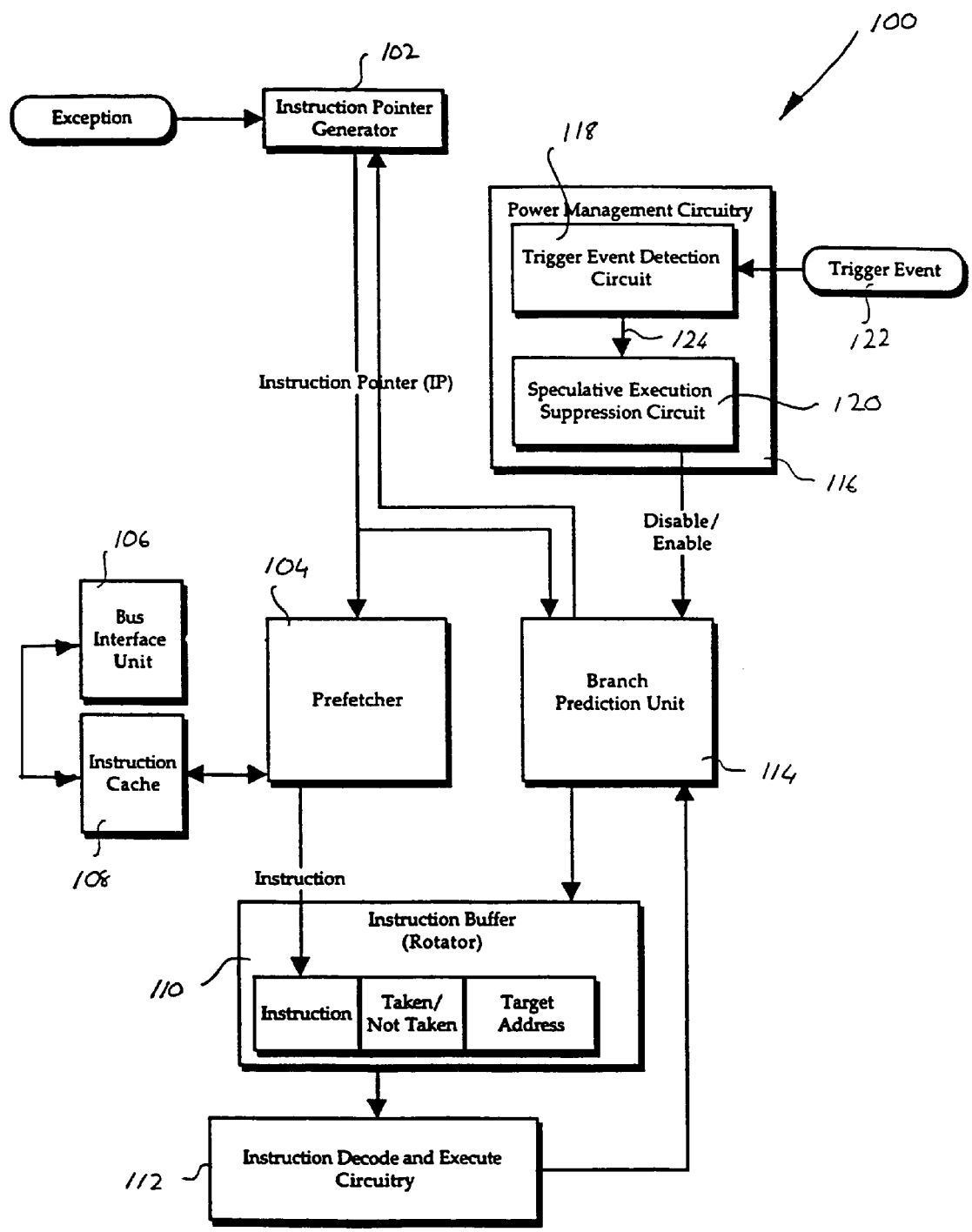
FIG. 6 is a diagrammatic representation of microprocessor circuitry in which is implemented a generic embodiment of apparatus, according to the invention, for selectively suppressing the speculative execution of instructions.

Description of Apparatus for Selectively Suppressing the Speculative Execution of Instructions within a Pipelined Microprocessor FIG. 6 shows a generic embodiment of the present invention in the form of microprocessor circuitry, indicated generally at 100, comprising an instruction pointer generator 102, a prefetcher 104, a bus interface unit 106, an instruction cache 108, an instruction buffer 110, instruction decode and execute circuitry 112, and a branch prediction unit (BPU) 114. The above units 102–114 may function in the manner described above with reference to FIG. 3. The circuitry 100 further includes power management circuitry 116, comprising a trigger event detection circuit 118 and a speculative execution suppression circuit 120. The circuits 118 and 120 may be implemented as a unit, as shown in FIG. 6, or may be located at removed locations within the microprocessor circuitry 100 or even integrated into other functional units. The detection circuit 118 is coupled to receive a trigger event input 122 which is utilized by the detection circuit 118 to detect a suppression trigger event. Examples of trigger event inputs and trigger events are provided below with reference to FIGS. 7–9. On the detection of a suppression trigger event, the detection circuit 118 is coupled to provide a detection signal 124 to the suppression circuit 120, which responds to the receipt of the detection signal 126 by disabling the BPU 114. The disabling of the BPU 114 may occur in any number of ways, and may require, merely for example, stopping a clock signal of the BPU 114 or disabling appropriate interface circuitry within the BPU 114. The detection circuit 118 may, in certain embodiments, also be configured to detect a reactivation trigger event, in which case an appropriate detection signal 124 is propagated to the suppression circuit 120, which in turn propagates an enable signal to the BPU 114, causing the BPU 114 to again become functional.

Figure 7:
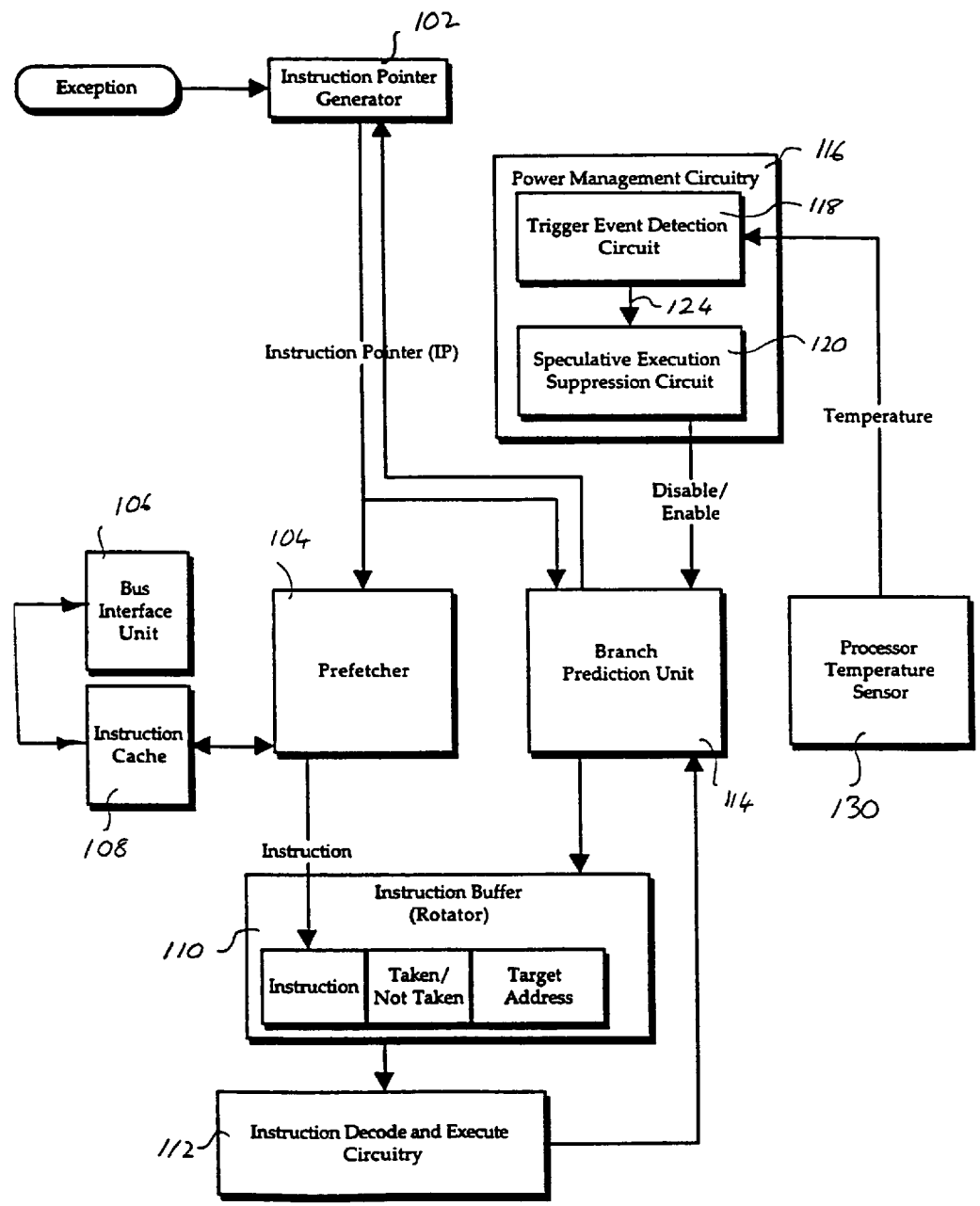
FIG. 7 is a diagrammatic representation of microprocessor circuitry in which is implemented a first embodiment of apparatus, according to the invention, for selectively suppressing the speculative execution of instructions.

In the manner described above, the present invention proposes the selective suppression of the speculative execution of instructions within a microprocessor. A number of exemplary embodiments of the generic circuitry shown is FIG. 6 are presented in FIGS. 7–9. In FIG. 7, an embodiment is illustrated in which the detection circuit 118 is coupled to receive a signal, indicative of the temperature of the microprocessor, from a temperature sensor 130. The detection circuit 118 is configured to compare the microprocessor temperature against a reference threshold value. If the microprocessor temperature exceeds the reference threshold value, a suppression trigger event is detected, and the detection circuit 118 outputs an appropriate detection signal 124 to the suppression circuit 120. The suppression circuit 120 then proceeds to suppress speculative execution of instructions with the microprocessor by disabling the BPU 114. Following disablement of the BPU 114, the microprocessor temperature may again drop to below the reference threshold value. This drop in temperature is detected by the detection circuit 118 by monitoring the output of the temperature sensor 130. The detection circuit 118 then outputs an appropriate detection signal 124 to the suppression circuit 120, which then enables the BPU unit 114. Thus, in the embodiment illustrated in FIG. 7, the speculative execution of instructions, and the accompanying power consumption, is modulated by thermal conditions with the microprocessor.

Figure 8:
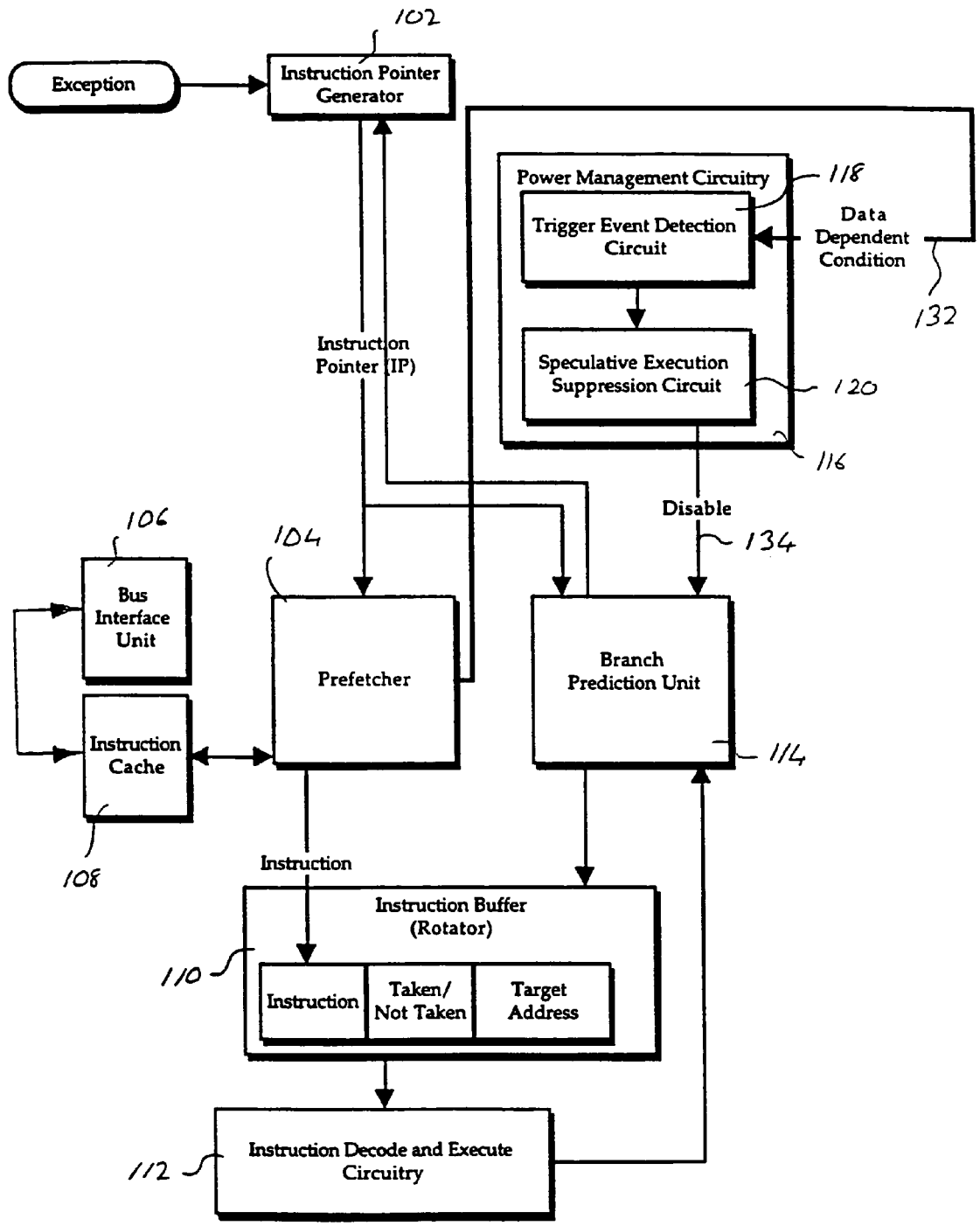
FIG. 8 is a diagrammatic representation of microprocessor circuitry in which is implemented a second embodiment of apparatus, according to the invention, for selectively suppressing the speculative execution of instructions.

FIG. 8 illustrates a further embodiment of the present invention, in which a decision regarding whether or not to suppress speculative execution is taken on a branch by branch basis. In this embodiment, information or characteristics associated with a specific branch instruction are examined to determine whether a prediction should be generated for the specific branch instruction and whether subsequent instructions should be speculatively processed by the microprocessor. The determination regarding whether to suppress speculative execution is made by the detection circuit 118 on the basis of information pertaining to a specific branch instruction received as a trigger event input. In the illustrated embodiment, the detection circuit 118 receives a signal 132 indicative of whether a specific branch instruction, retrieved by the prefetcher 104 from either the instruction cache 108 or from main memory via the bus interface unit 106, is a data dependent branch instruction (i.e., dependent on variable data, such as a video, audio or other unpredictable data). If so, a trigger event is detected by the detection circuit 118, and an appropriate signal transmitted to the suppression circuit 120, which asserts a disable signal 114 until the relevant branch instruction is resolved by the instruction decode and execute circuitry 112. The disable signal 134 is propagated to the BPU 114, which is disabled in response to the assertion of this signal. On the other hand, if the branch instruction is not "data dependent" (i.e., a qualifying condition is not dependent on highly variable and irregular data), no trigger event is detected, and the disable signal 134 is not asserted. The determination of whether an instruction is "data dependent" may be made at compilation of a computer program by a compiler (not shown). For example, the compiler may examine the data source upon which resolution of the qualifying condition of the branch instruction is dependent. If the data source produces relatively predictable data, the branch instruction may be flagged by the compiler as not being "data dependent". However, if the data source is determined to provide unpredictable information (such as a video or audio source), then the branch instruction may be flagged as being "data dependent" by the compiler. In one embodiment of the present invention, a "data dependent" branch instruction is a branch instruction which presents a qualifying condition, the resolution of which is dependent of data generated external to a computer program including the relevant branch instruction.

Figure 9:
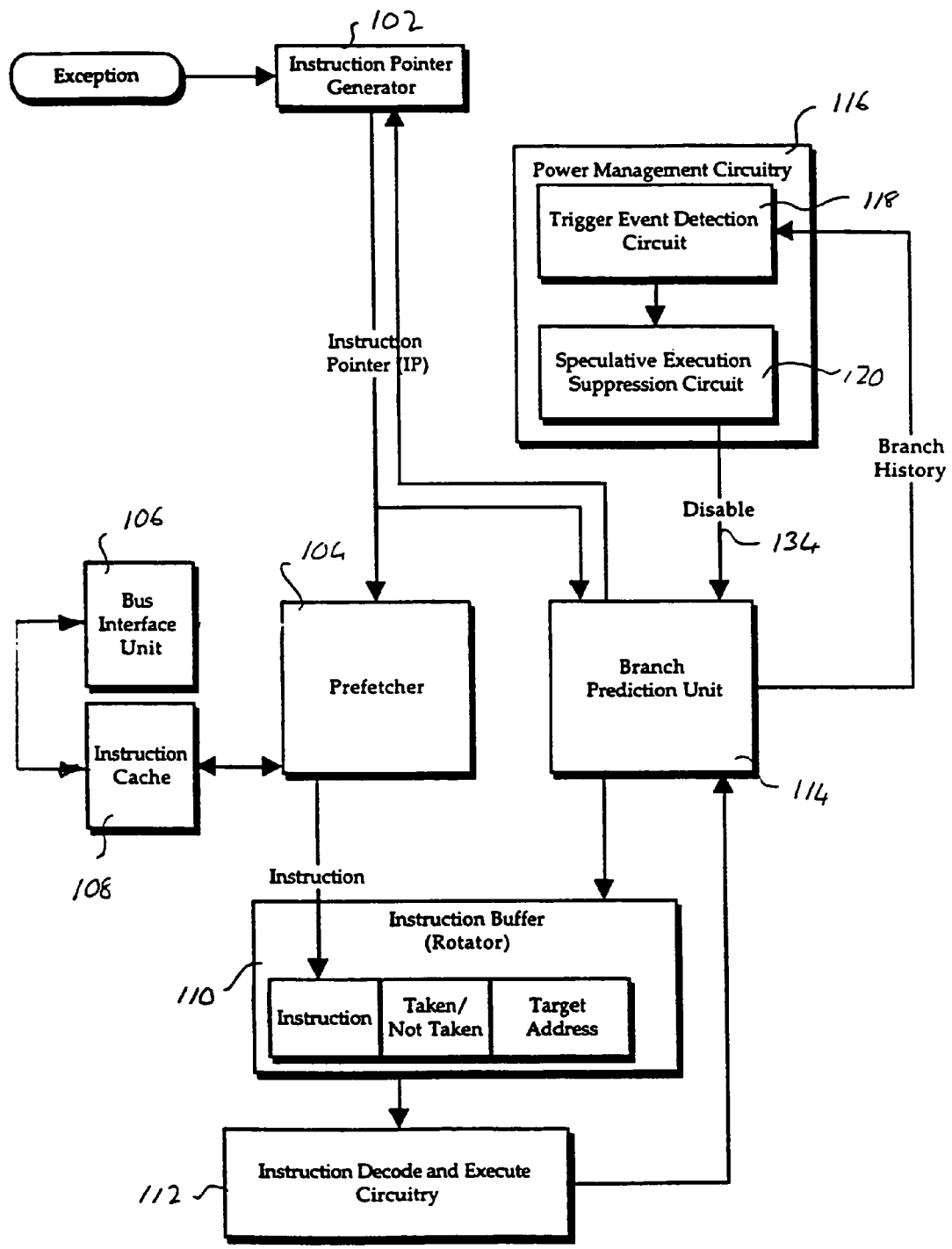
FIG. 9 is a diagrammatic representation of microprocessor circuitry in which is implemented a third embodiment of apparatus, according to the invention, for selectively suppressing the speculative execution of instructions.

A further embodiment of the present invention is shown in FIG. 9, in which branch instructions are individually examined to determine whether speculative execution should be suppressed or not. Specifically, branch history information is propagated from the BPT 114 to the detection circuit 118, where an estimate of the probability of the branch instruction being correctly predicted is made based on the branch history information. If it is estimated that the probability of a subsequent prediction for the relevant branch instruction being correct is below a predetermined percentage (e.g., 60%), then a trigger event is detected, and an appropriate signal propagated to the suppression circuit 120. The suppression circuit 120 in response asserts the disable signal 134 until the relevant branch instruction has been resolved. Alternatively, if it is determined that the probability of a correct prediction for the specific instruction being generated is high, no trigger event is detected, and the BPU 114 is not disabled.

Figure 10:
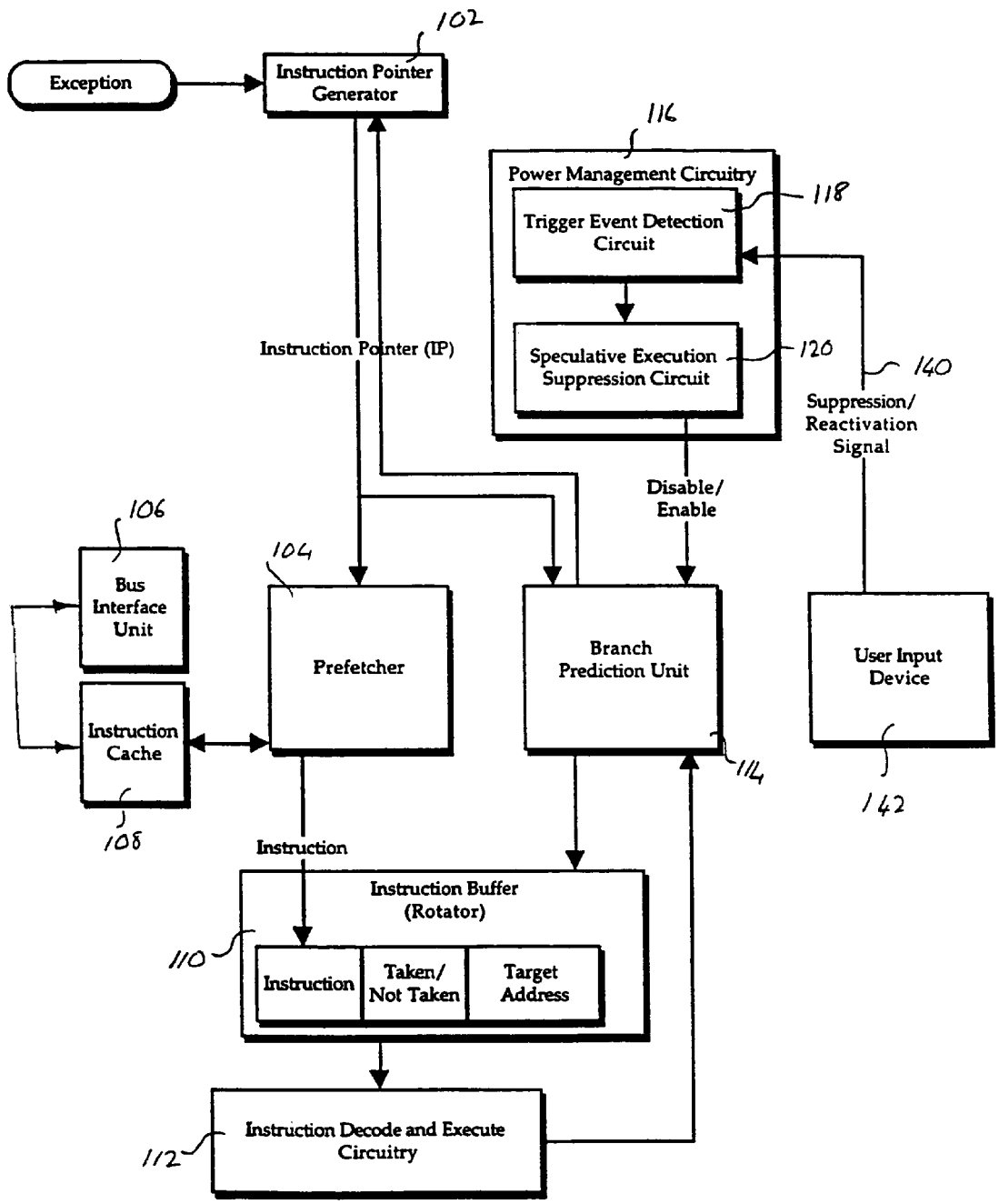
FIG. 10 is a diagrammatic representation of microprocessor circuitry in which is implemented a fourth embodiment of apparatus, according to the invention, for selectively suppressing the speculative execution of instructions.

Yet a further embodiment of the present invention is illustrated in FIG. 10, wherein the trigger event input comprises a user activated suppression/reactivation signal 140. This signal 140 may be generated by a user utilizing an input device 142, such as a keyboard or graphical user interface (GUI) and pointing device combination. A user may select to either suppress or activate speculative instruction execution by toggling the suppression/reactivation signal 140. The detection circuit 118 monitors the suppression/reactivation signal 140, and detects a trigger event when this signal 140 is toggled. The suppression circuit 120 is signaled by the detection circuit 118, as described above, which in turn either disables or enables the BPU 114. This embodiment allows a user to elect to sacrifice microprocessor performance in a computer system to reduce power consumption within a microprocessor, and to achieve a resulting reduction in heat generation. This feature is particularly appealing in both the desktop and portable computing environments, where a user's computer system may be threatening to exceed predetermined thermal limitations under certain processing loads.

Figure 11:
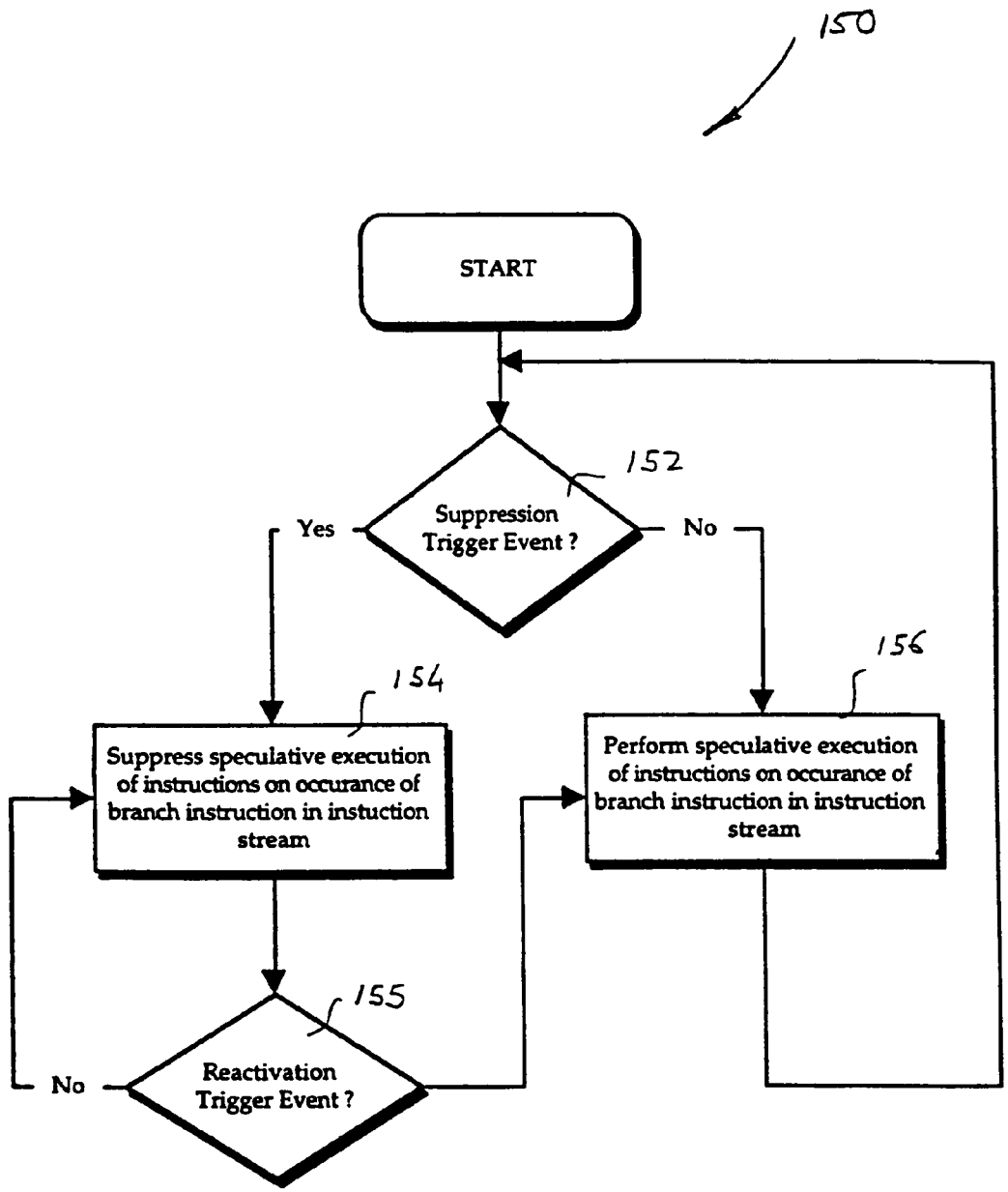
FIG. 11 is a flowchart illustrating a generic method, according to the invention, of performing power management by the selective suppression of the speculative execution of instructions within a microprocessor.

Description of Methods of Power Management by the Selective Suppression of the Speculative Execution of Instructions within a Pipelined Microprocessor FIG. 11 is a flowchart illustrating a generic method 150, according to the invention, of power management by the selective suppression of the speculative execution of instructions within a microprocessor. The method 150 requires the detection of a suppression trigger event at decision box 152. If a suppression trigger event is detected at box 152, the method proceeds to step 154, where speculative execution of instructions proceeding a branch instruction within an instruction stream is suppressed. The method 150 then proceeds to decision box 155, where a determination is made as to whether a reactivation trigger event has been detected. If not, the method loops back to step 154, and speculative execution remains suppressed. Alternatively, if a reactivation trigger event is detected at box 155, the method branches to step 156, at which branch prediction and speculative execution are resumed. If at box 152 no suppression trigger event is detected, the method proceeds to step 156, and the microprocessor is able to generate predictions for branch instructions within an instruction stream and to speculatively execute instructions relying on the predictions.

Figure 12:
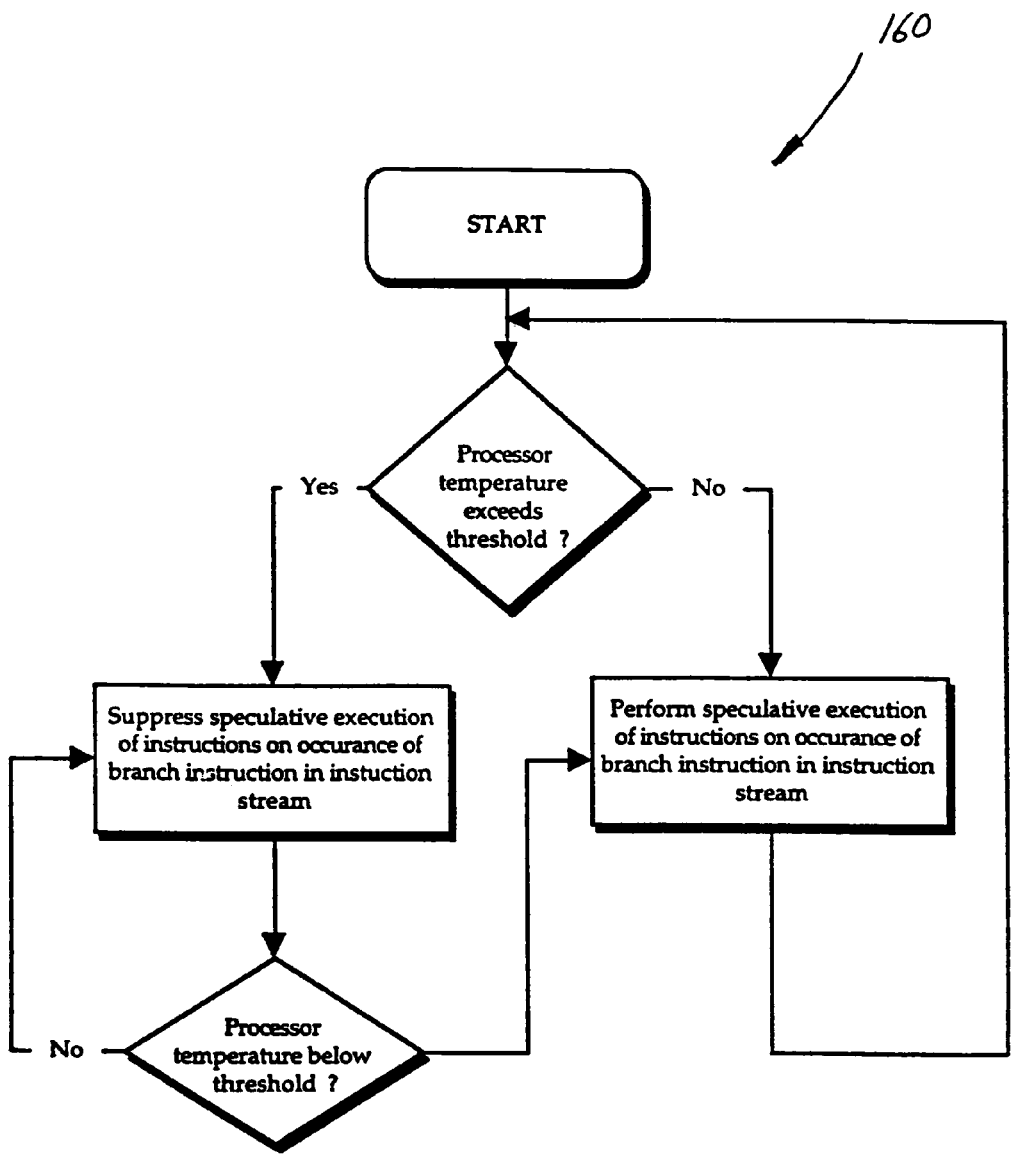
FIG. 12 is a flowchart illustrating a first exemplary method, according to the invention, of performing power management by the selective suppression of the speculative execution of instructions within a microprocessor.
Figure 13:
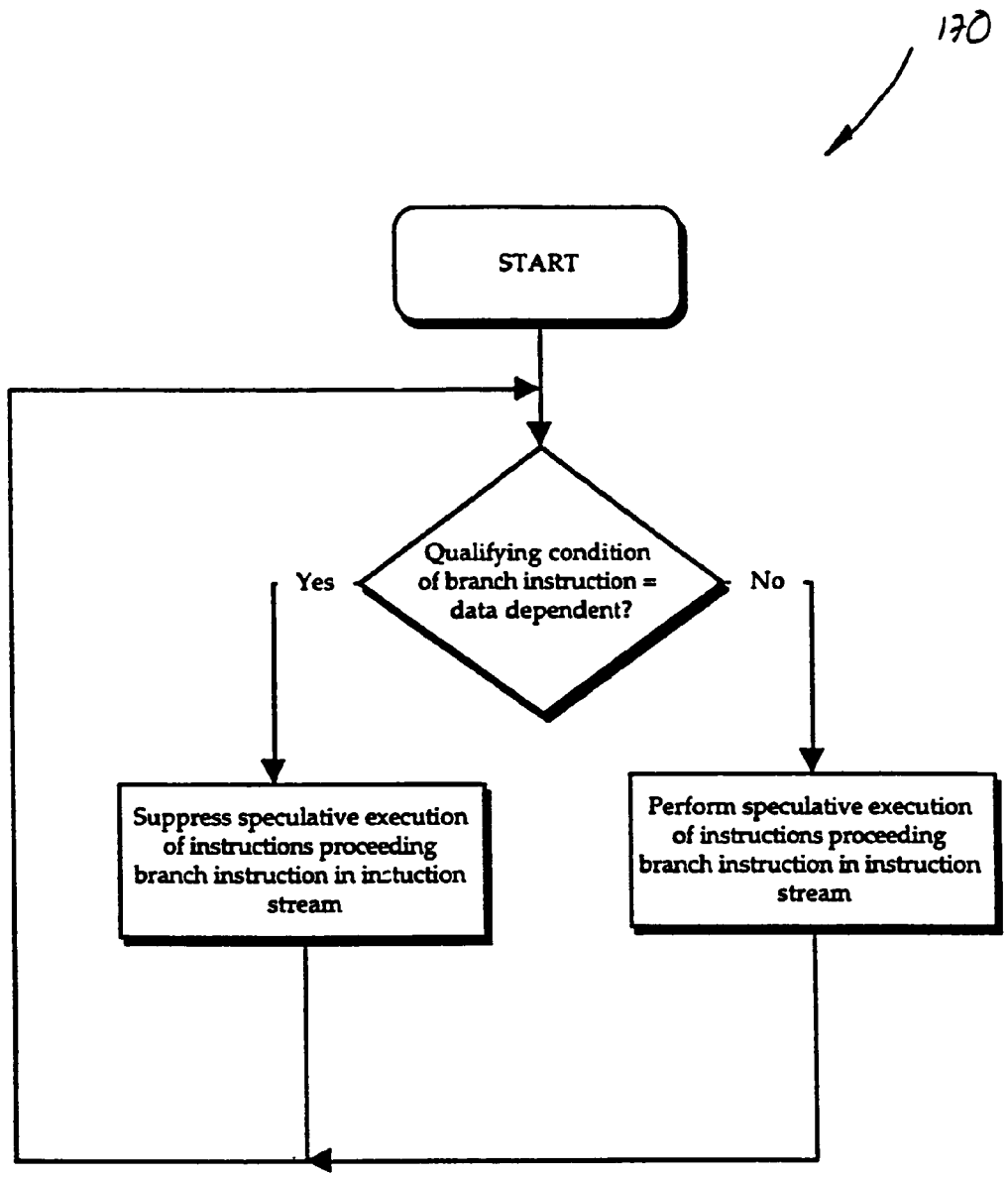
FIG. 13 is a flowchart illustrating a second exemplary method, according to the invention, of performing power management by the selective suppression of the speculative execution of instructions within a microprocessor.
Figure 14:
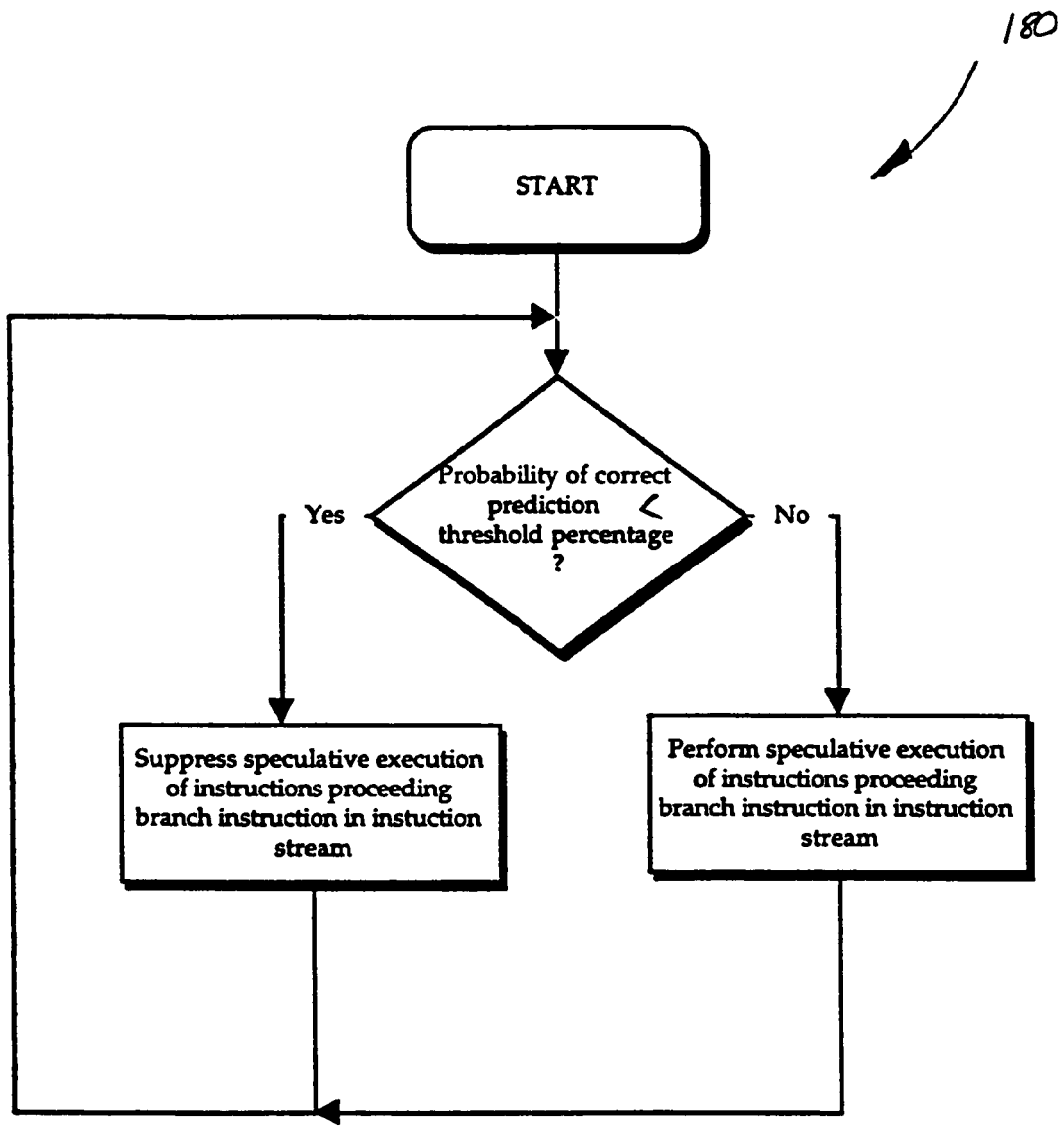
FIG. 14 is a flowchart illustrating a third exemplary method, according to the invention, of performing power management by the selective suppression of the speculative execution of instructions within a microprocessor.

FIG. 12 is a flow chart illustrating a method 160, according to the invention, in which the trigger event is the transcendence by the temperature of the microprocessor of a predetermined threshold temperature. FIGS. 13 and 14 are flowcharts illustrating methods 170 and 180, according to the invention, in which determinations are made on a branch by branch basis whether to suppress:

1. the generation of a prediction for a specific branch instruction; and
2. the speculative execution of instructions proceeding the specific branch instruction, until a qualifying condition presented by the specific branch instruction is resolved.

Figure 15:
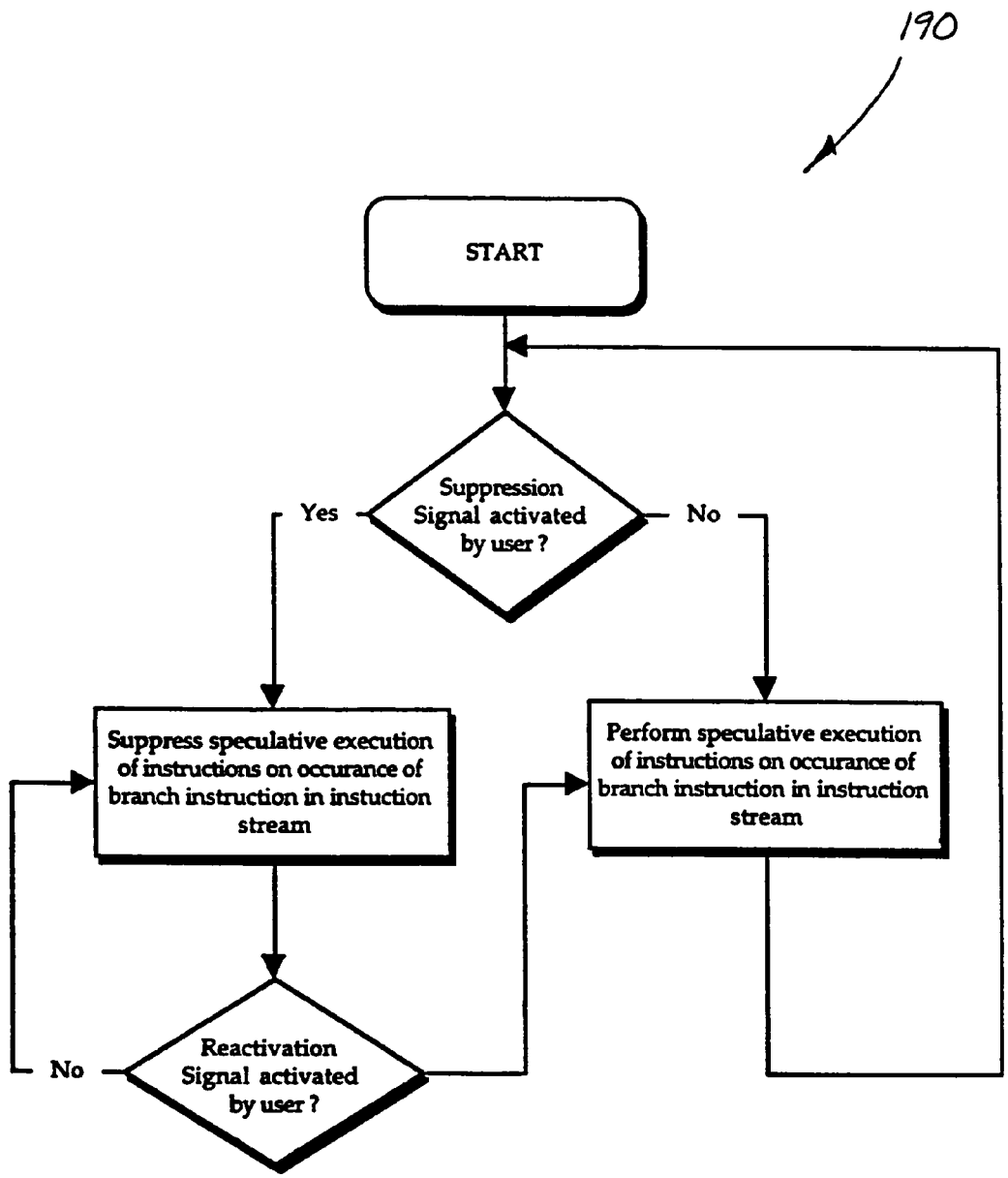
FIG. 15 is a flowchart illustrating a fourth exemplary method, according to the invention, of performing power management by the selective suppression of the speculative execution of instructions within a microprocessor.

In method 170, the trigger event is the determination that the qualifying condition of the branch instruction is dependent on highly unpredictable data, such as data generated external to the computer program itself (i.e., a determination that the branch instruction is "data dependent"). In method 180, the trigger event is the determination that the probability of a correct prediction is lower than a predetermined threshold percentage. Finally, FIG. 15 illustrates a method 190 according to the invention in which the trigger event is the activation of a suppression signal by a user of a computer system.

The present invention is advantageous in that it creates a power reduction mode, in which a microprocessor can operate, that strikes a compromise between power reduction and performance loss. For example, the present invention could be used to implement a microprocessor having four modes of operation, namely:

1. a "full speed" mode in which the microprocessor is configured to deliver maximum performance coupled with maximum power consumption;
2. a "speculative-suppressed" mode in which the speculative execution of instructions is limited or totally suppressed, to provide a limited power saving and a reduction in performance;
3. a "clock-throttled" mode, in which the operating frequency of the microprocessor is reduced to deliver greater power savings and an accompanying greater reduction in performance; and 4. a "shutdown/suspend" mode in which the clock signal to the microprocessor is stopped to achieve a maximum power saving.

Thus, a method and apparatus for suppressing the speculative execution of instructions within a pipelined microprocessor have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method including:
   detecting a compiler-generated indication associated with a branch instruction; and
   responsive to the detection of the compiler-generated indication, disabling a branch prediction unit within a processor so as to suppress execution of instructions downstream of the branch instruction within an instruction stream prior to resolution of a qualifying condition of the branch instruction.

2. The method of claim 1 wherein the compiler-generated indication indicates that data, upon which resolution of the qualifying condition of the branch instruction is dependent, comprises unpredictable information.

3. The method of claim 2 wherein the unpredictable information includes any one of a group including audio and video data.

4. The method of claim 1 wherein the disabling of the branch prediction unit comprises disabling a clock signal to the branch prediction unit.

5. Apparatus comprising:
   a detector to detect a compiler-generated indication associated with a branch instruction; and a disabler, coupled to the detector, to disable a branch prediction unit within a processor responsive to the compiler-generated indication so as to suppress execution of instructions downstream of the branch instruction within an instruction stream prior to resolution of a qualifying condition of the branch instruction.

6. The apparatus of claim 5 wherein the compiler-generated indication indicates that data, upon which resolution of the qualifying condition of the branch instruction is dependent, comprises unpredictable information.

7. The apparatus of claim 6 wherein the unpredictable information includes any one of a group including audio and video data.

8. The apparatus of claim 5 wherein the disabler is to disable a supply of a clock signal to the branch prediction unit.

9. Circuitry comprising:
   first means for detecting a compiler-generated indication associated with a branch instruction; and
   second means, coupled to a detector, for disabling a branch prediction unit within a processor responsive to the compiler-generated indication so as to suppress execution of instructions downstream of the branch instruction within an instruction stream prior to resolution of a qualifying condition of the branch instruction.

10. The circuitry of claim 9 wherein the compiler-generated indication indicates that data, upon which resolution of the qualifying condition of the branch instruction is dependent, comprises unpredictable information.

* * * * *